Dec. 14, 1965  D. K. SACKEN ETAL  3,223,490
CATALYST LOADER AND METHOD OF FILLING TUBES
Filed Feb. 9, 1962  2 Sheets-Sheet 1

INVENTORS
DONALD K. SACKEN
THOMAS R. YOUNG
BY
Cushman, Darby & Cushman
ATTORNEYS

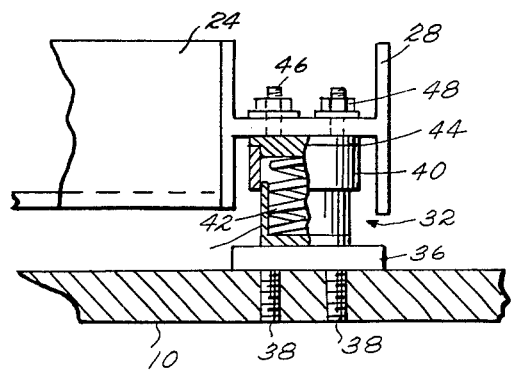
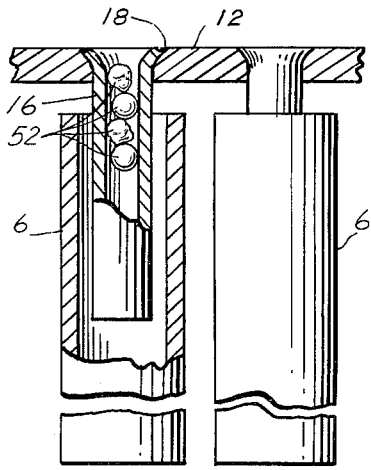
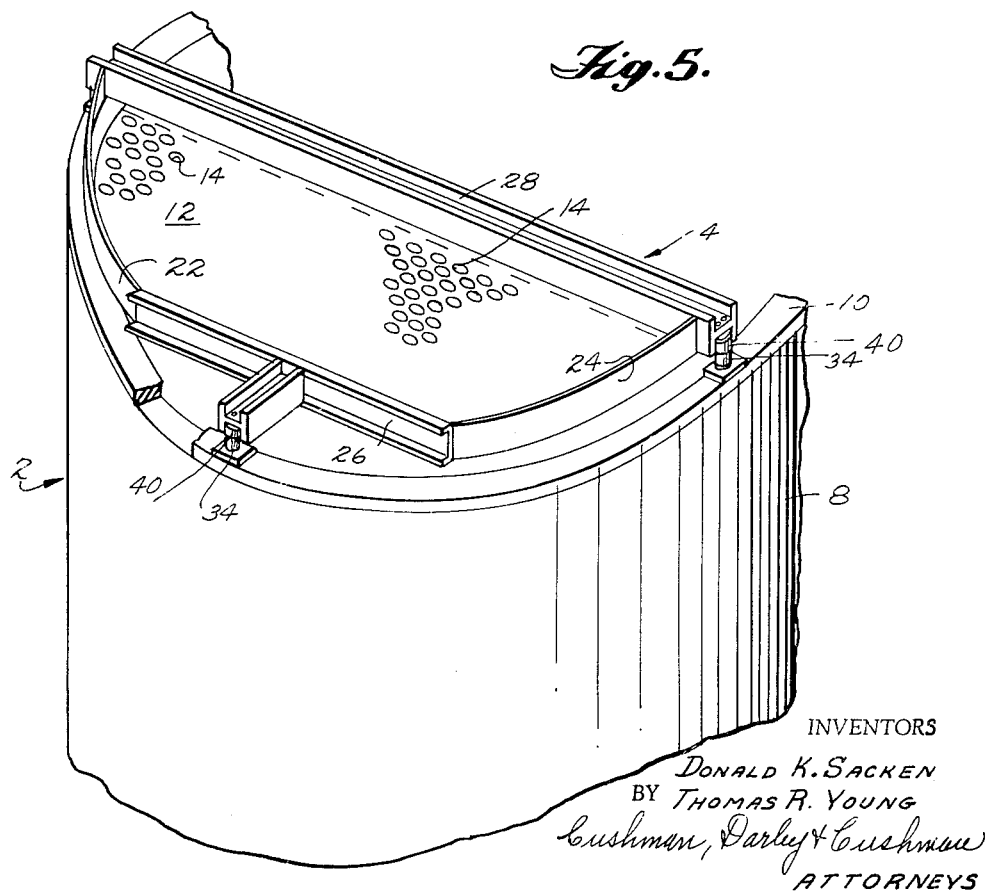

3,223,490
CATALYST LOADER AND METHOD OF
FILLING TUBES
Donald K. Sacken, Beaumont, Tex., and Thomas R. Young, Riverside, Conn., assignors to Houston Chemical Corporation, New York, N.Y., a corporation of Texas
Filed Feb. 9, 1962, Ser. No. 173,089
9 Claims. (Cl. 23—288)

This invention relates to improvements in an apparatus for loading catalyst in a reactor.

Many reactors, e.g. of the fixed-bed reactor type are in essence a shell and tube exchanger containing a multitude of tubes. These tubes have to be filled with a large number of small catalyst particles. Also there must be an even distribution of the catalyst particles into the multiplicity of tubes, so as to insure an equal distribution of the reaction fluid, either gaseous and/or liquid, through the various tubes and thus obtain a better control of the catalyzed reaction with resultant higher yield of the desired product. Speed in loading of the reactor leads to an improved reactor on-stream time, and, hence to an improved production capacity.

The reactor tubes are somewhat narrow and it is essential that only one catalyst pellet enter a tube at a time. Otherwise a condition known as "bridging" can occur, resulting in unevenly and incompletely loaded tubes. "Bridging" occurs when several catalyst pellets entering and falling down into the tube simultaneously, wedge together part way down the tube and leave a void space in the tube.

It is an object of the present invention to speed up the loading of a reactor made up of a multitude of tubes.

Another object is to eliminate bridging in the loading of such a reactor.

A further object is to insure even distribution of the catalyst particles in a reactor comprising a multitude of tubes.

An additional object is to develop a catalyst loader which is simple to construct and can be efficiently operated.

Yet another object is to eliminate the manual adjusting of the final level of catalyst in each reactor tube.

With the foregoing other objects in view it will become apparent as the description proceeds. The invention consists of certain novel features of construction, arrangement and combination of parts and method hereinafter fully described, and/or illustrated fully in the accompanying drawings, and particularly pointed out in the appended claims.

For the purpose of facilitating an understanding of the invention, there is illustrated in the accompanying drawings a preferred embodiment thereof. While one form of the invention is described in considerable detail in connection with the drawings, it will be understood by those skilled in the art that numerous modifications can be made therein without departing from the scope of the invention which is limited only by the claims.

In the drawings:

FIGURE 3 is an enlarged vertical sectional view showing the manner of joining the catalyst loader to the reactor;

FIGURE 4 is an enlarged vertical elevation, partially in section showing the means for filling the reactor tubes; and FIGURE 5 is a perspective view showing the catalyst loader in place over the reaction.

Figure 1:
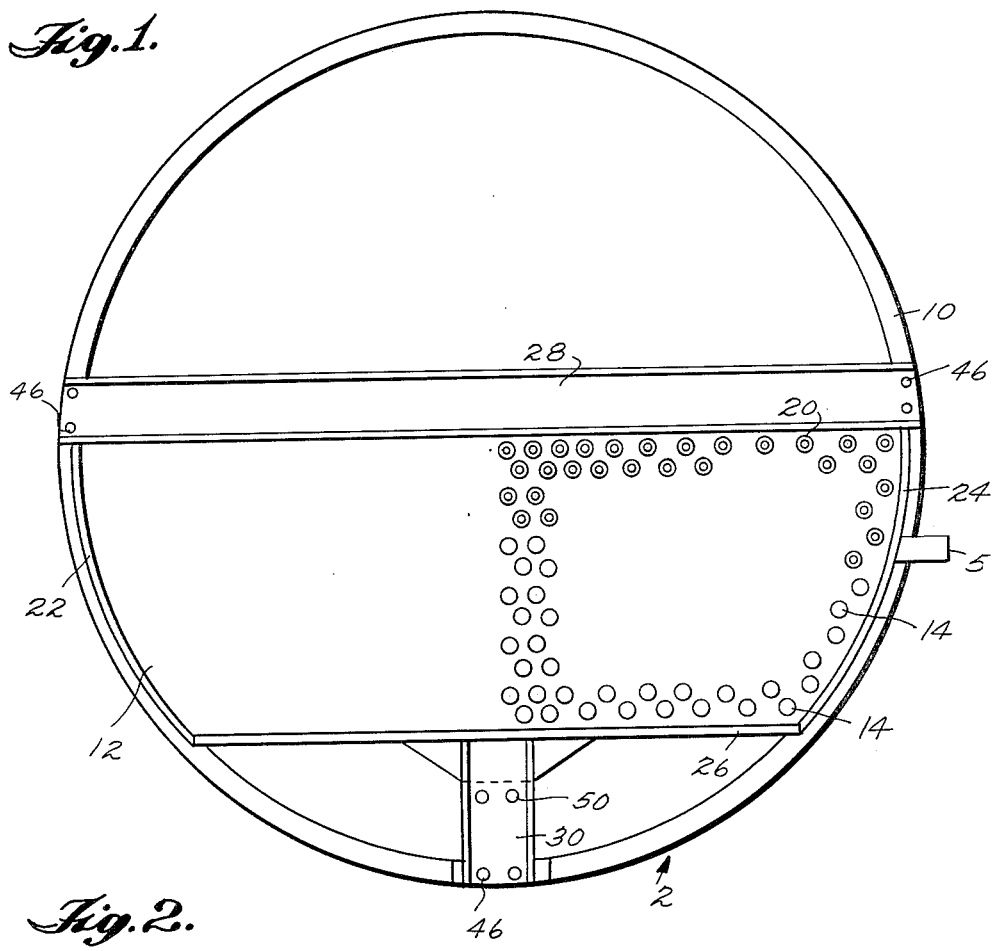
FIGURE 1 is a top plan view of the catalyst loader in place over the tube and shell reactor.
Figure 2:
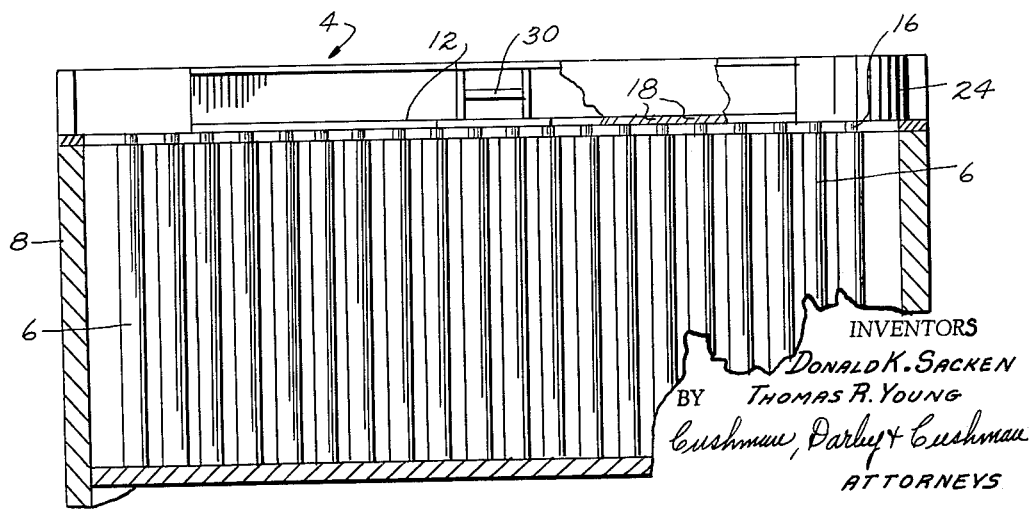
FIGURE 2 is a vertical elevation partially broken away and partially in section of the loader and reactor.

The particular catalyst loader described in connection with the drawings was used to load solid particles of silver-coated Alundum for the production of ethylene oxide from ethylene and oxygen. While preferably the loader is designed to load all of the tubes of the reactor simultaneously it is possible to employ the loader so as to load only a portion of the tubes.

In the specific example described in connection with the drawing, the loader loaded the 3377 tubes of the reactor simultaneously. The catalyst particles were fed evenly into each of the 3377 tubes and the final level of the catalyst particles in each tube was the same ± one inch even though each tube had a total length of 300 inches. The speed of loading was found to be limited only by the time required to pour the catalyst into the loader. In one test, the full tube length of 300 inches of all the tubes was filled in less than one hour, feeding single catalyst particles into each tube being loaded. To load the same number of tubes evenly and completely by other known means would require 10 to 30 times as long.

Referring more specifically to the drawings, there is provided a reactor indicated generically at 2 and a catalyst loader indicated generically at 4.

The reactor comprises a multitude of tubes (3377 in the specific example) 6 inside the wall 8 of the reactor. The wall 8 terminates in a bolt ring 10 which at its upper end is slightly above the upper end of tubes 6.

The catalyst loader 4 comprises a flat plate 12 drilled to the same pattern of holes 14 as the tubes in the reactor (or a portion thereof). Thus in the illustrative example there would be 3377 holes drilled in the flat plate 12. (While the plate 12 is substantially completely drilled only a small fraction of the holes are shown in the drawings). The drilled holes 14 are somewhat smaller than the reactor tubes 6. In the specific examples the holes were about 0.5 inch in diameter in comparison to the 1.0 inch diameter of the reactor tubes. Through each hole is lowered a loose fitting fill tube 16. Each fill tube 16 has a lip 18 on the top which fits snugly into a beveled edge 20 of the corresponding drilled hole 14 to retain the fill tubes. The length of the fill tube 16 is such that when all of the catalyst has been loaded into the reactor tubes via the fill tubes and to the top of each fill tube, and the loader is lifted up (so that the catalyst in the fill tube falls into the corresponding reactor tube) the final level in each reactor tube is at the desired height in the tube, e.g. 1 inch below the top. This eliminates any "topping" requirements, i.e., manually adjusting the final level of catalyst in each reactor tube. It has been found that by this procedure many man-hours of labor are eliminated.

The loader plate 12 is surrounded by side walls 22 and 24, a channel member 26 in the front and I-beam 28 in the back. The side walls, channel member and I-beam are of sufficient height to keep catalyst particles from being lost from the loder. In the specific example they were all about 10 inches high. Secured to the channel member 26 and perpendicular to it is a short I-beam 30.

The loader 4 is removably secured to the reactor 2 in a manner which is best illustrated in FIGURE 3.

At opposite ends of I-beam 28 and at the outer end of I-beam 30 there are provided shock absorbers 32. The shock absorbers 32 comprise a male housing 34 welded at the bottom to a mount plate 36. The mount plate 36 is provided with a pair of pins 38. There is also provided a female housing 40 which fits over the housing 34. Inside housings 34 and 40 is a spring 42. Housing 40 is welded to a mount plate 44 to which are attached bolts 46. Bolts 46 pass through appropriate holes drilled in I-beam 28 (and I-beam 30) and are removably secured to the I-beam by nuts 48. By drilling a second set of holes 50 in the I-beam it is possible to employ the same loader with a smaller size reactor.

In order to position the loader 4 on the reactor 2 pins 38 are passed through holes in the bolt ring 10. The pins are designed to fit loosely in the bolt rings. The loader is placed on the reactor by positioning the housings 34 around the respective housings 40. Thus the loader is seated upon, or supported by the springs which permit a small amount of vibratory motion in a vertical plane. In the specific example the maximum vertical motion was ⅛ inch. A vibration inducing device shown schematically at 5 is attached to one of the sides of the loader. In the specific example a conventional air vibrator was employed. The vibrator provided adequate motion to the loader to cause the catalyst particles to fall into the catalyst fill tubes 16 and, thence, into the reactor tubes 6. The diameter of the fill tubes is so selected as to permit one, and only one, catalyst particle or granule 52 (FIGURE 4) to enter a fill tube at any instant and then to fall into the reactor tube. In this manner the possibility of "bridging" is eliminated.

The loader of the present invention is designed to load granular particles of catalyst. Such catalysts have a significant particle size, e.g. $\frac{1}{16}$ inch or more for the maximum diameter particles, as distinguished from powder material of extremely fine mesh size, e.g., 300 mesh or less. In the illustrative example the particles were all of particle size above ¼ inch and below ½ inch. The granules can be in the form of spheres, pellets or even of irregular shape.

What is claimed is:

1. A method of uniformly loading a shell and tube catalyst reactor having a multitude of elongated vertical tubes with a granular catalyst in a manner to avoid bridging and wherein said tubes have an internal diameter substantially greater than the diameter of a single granule of said catalyst, said method comprising:
  (1) positioning above said reactor catalyst a loader, said loader comprising a plate having a multitude of openings corresponding to said elongated tubes and a granule retaining wall surrounding said plate,
  (2) positioning fill tubes of said loader through said openings and into the upper ends of said elongated tubes, each of said fill tubes having an upper end which is retained in said plate and each fill tube having an internal diameter such that only one catalyst granule can pass therethrough at a time into an elongated tube, said fill tubes terminating substantially above the bottom of said elongated tubes,
  (3) filling the loader with catalyst granules of such size that only one granule at a time will go into a fill tube,
  (4) vibrating said loader to cause catalyst granules to enter and pass through said fill tubes to said elongated tubes, and
  (5) removing the catalyst loader from above said reactor.

2. A process according to claim 1 wherein catalyst granules are passed through said fill tubes into said elongated tubes until the fill tubes are loaded to the top with catalyst prior to removing the loader from above the reactor and the fill tubes are of such length that the final level of catalyst in each elongated tube is at the same predetermined point near the top thereof.

3. In an arrangement for loading with granules a multiplicity of elongated reactor tubes that are subject to being undesirably bridged by the granules, the improvement comprising:
  a plate having depending from respective spaced apertures therein a corresponding multiplicity of fill tubes of such predetermined length and outer diameter as to extend inside said elongated tubes respectively a predetermined distance which is substantially less than the length of the respective elongated tube, and of such predetermined inner diameter as to allow feeding of said granules through each fill tube only one granule at a time.

4. Apparatus as in claim 3 wherein said fill tubes are removable from said elongated tubes and said predetermined distance is such that removal of the fill tubes, after granules have been fed therethrough into the said elongated tubes and the granules have reached the top of the fill tubes, leaves the elongated tubes filled to a predetermined level.

5. In an arrangement for loading with granules a multitude of vertical elongated tubes that are subject to being undesirably bridged by the granules, the improvement comprising:
  a device including
  a multitude of vertical fill tubes each of which has a limited transverse inner dimension for simultaneously and uniformly loading individual granules only one by one into each of said elongated tubes to avoid said bridging,
  a plate above said elongated tubes and having a multitude of openings corresponding to said elongated tubes,
  a granule retaining wall surrounding said plate,
  cooperating means between said plate and said fill tubes to prevent only the upper end of a fill tube from passing through a said opening,
  each of said fill tubes extending from an opening in said plate into a corresponding elongated tube and terminating substantially above the bottom of that elongated tube to effect a desired fill thereof.

6. A combination according to claim 5 including means for resiliently and removably mounting said plate above said elongated tubes and means for vibrating said plate and fill tubes while the fill tubes are maintained substantially at a given insertion depth in said elongated tubes to cause said granules to enter said fill tubes.

7. In the loading of a multiplicity of adjacent reactor tubes with solid catalyst particles, the improvement including the steps of:
  disposing removable fill tubes, each of which has a transverse inner dimension restricting passage therethrough to only one particle at a time, respectively into said rector tubes to a predetermined depth substantially shorter than the length of the reactor tubes,
  supplying said particles to a loader,
  simultaneously feeding from said loader a multiplicity of said particles into said reactor tubes one particle at a time through said fill tubes to the top of each fill tube, and then
  removing said fill tubes to leave each of the reactor tubes filled to the same level controlled by said predetermined depth and top fill.

8. For use in filling with catalyst granules a multitude of elongated reactor tubes each subject to being undesirably bridged by the granules, a loader for said elongated tubes, comprising:
  means, including a corresponding multitude of fill tubes each of which has a limited transverse inner dimension for fiilling each said elongated tube with said granules only one at a time, insuring that granules enter said elongated tubes only through said fill tubes for avoiding the said bridging during loading of the elongated tubes, said fill tubes being of smaller external diameter than the internal diameter of said elongated tubes, one end of each fill tube extending into and terminating substantially above the bottom of the corresponding elongated tube, and means for simultaneously filling each of said fill tubes with granules for simultaneously filling said reactor tubes.

9. A combination according to claim 8 wherein the fill tubes are removable and of such length and insertion depth that when they are removed from the elongated tubes the final level of granules in each elongated tube is at the same predetermined point near the top thereof.

References Cited by the Examiner
UNITED STATES PATENTS

| | | | |
|---|---|---|---|
| 518,973 | 5/1894 | Tanner | 141—238 X |
| 1,488,603 | 4/1924 | Kouwenhoven | 141—238 |
| 1,848,346 | 3/1932 | Griswold. | |
| 2,655,273 | 10/1953 | Snow | 214—17.6 |
| 2,706,072 | 4/1955 | Furno | 222—196 X |
| 2,784,746 | 3/1957 | Silver | 141—238 X |
| 2,976,757 | 3/1961 | Schulz | 122—196 X |
| 3,148,037 | 9/1964 | Szego | 23—288 |

MORRIS O. WOLK, *Primary Examiner.*

GEORGE D. MITCHELL, *Examiner.*